(12) United States Patent
Mammen et al.

(10) Patent No.: US 12,079,187 B2
(45) Date of Patent: *Sep. 3, 2024

(54) SELECTING INTERFACES FOR DEVICE-GROUP IDENTIFIERS

(71) Applicant: Cisco Technology, Inc., San Jose, CA (US)

(72) Inventors: Biju Mathews Mammen, Mountain House, CA (US); Hrishikesh Narasimhan, Cupertino, CA (US); Balaji Muthuvarathan, Fremont, CA (US); Thekkar Nishanth Prabhu, Milpitas, CA (US); Yu Li, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/119,107

(22) Filed: Mar. 8, 2023

(65) Prior Publication Data

US 2023/0222110 A1 Jul. 13, 2023

Related U.S. Application Data

(63) Continuation of application No. 17/717,340, filed on Apr. 11, 2022, now Pat. No. 11,625,378, which is a (Continued)

(51) Int. Cl.
*H04L 45/00* (2022.01)
*G06F 11/00* (2006.01)
(Continued)

(52) U.S. Cl.
CPC .......... *G06F 16/2255* (2019.01); *H04L 41/12* (2013.01); *H04L 61/45* (2022.05); *H04L 2101/604* (2022.05)

(58) Field of Classification Search
CPC ............ G06F 16/2255; G06F 11/2005; G06F 11/2007; G06F 9/5011; G06F 9/505;
(Continued)

(56) References Cited

U.S. PATENT DOCUMENTS 8,762,534 B1 6/2014 Hong et al.
8,873,567 B1 10/2014 Mandal et al.
(Continued)

FOREIGN PATENT DOCUMENTS

EP 1729461 A1 6/2006

OTHER PUBLICATIONS

Office Action for U.S. Appl. No. 16/563,122, mailed on Apr. 19, 2021, Mammen, "Selecting Interfaces for Device-Group Identifiers", 22 Pages.
(Continued)

*Primary Examiner* — Schquita D Goodwin
(74) *Attorney, Agent, or Firm* — Lee & Hayes, P.C.

(57) ABSTRACT

In one embodiment, a computer networking device calculates a first hash value for an identifier of a group of computing devices, as well as a second hash value for the identifier of the group of computing devices, with each hash value being at least in part on the identifier of the group of computing devices and an identifier of the respective interface. The computer networking device may also analyze the first hash value with respect to the second hash value and select the first interface for association with the identifier of the group of computing devices based at in part on the analyzing. The computer networking device may further store an indication that the identifier of the group of computing devices is associated with the first interface.

20 Claims, 11 Drawing Sheets

Related U.S. Application Data continuation of application No. 16/563,122, filed on Sep. 6, 2019, now Pat. No. 11,334,546.

(60) Provisional application No. 62/855,859, filed on May 31, 2019.

(51) Int. Cl.
  *G06F 16/22* (2019.01)
  *H04J 1/16* (2006.01)
  *H04L 41/12* (2022.01)
  *H04L 61/45* (2022.01)
  *H04L 101/604* (2022.01)

(58) Field of Classification Search
  CPC ..... G06F 9/5072; G06F 9/5083; H04L 41/12; H04L 61/45; H04L 2101/604; H04L 61/5069; H04L 41/0893; H04L 45/22; H04L 45/24; H04L 45/28; H04L 45/54; H04L 45/7453; H04L 41/0663; H04L 47/125
  See application file for complete search history.

(56) References Cited

U.S. PATENT DOCUMENTS

| | | | |
|---|---|---|---|
| 9,565,114 B1 | 2/2017 | Kabbani et al. | |
| 10,116,567 B1* | 10/2018 | Singh | H04L 12/18 |
| 10,218,629 B1 | 2/2019 | An et al. | |
| 10,277,485 B1 | 4/2019 | Richard et al. | |
| 10,326,830 B1 | 6/2019 | Singh | |
| 10,382,217 B1 | 8/2019 | Kebler et al. | |
| 10,404,619 B1* | 9/2019 | Agrawal | H04L 45/38 |
| 10,608,937 B1 | 3/2020 | Volpe et al. | |
| 10,644,895 B1* | 5/2020 | Mammen | H04L 49/1515 |
| 10,791,046 B2* | 9/2020 | Sharif | H04L 45/125 |
| 10,862,749 B1 | 12/2020 | Kiyak et al. | |
| 11,070,472 B1 | 7/2021 | Maharia | |
| 11,334,546 B2 | 5/2022 | Mammen et al. | |
| 2006/0274647 A1 | 12/2006 | Wang et al. | |
| 2007/0019646 A1 | 1/2007 | Bryant et al. | |
| 2008/0285472 A1 | 11/2008 | Abdulla et al. | |
| 2012/0179691 A1 | 7/2012 | Cao et al. | |
| 2015/0127797 A1 | 5/2015 | Attar et al. | |
| 2016/0197831 A1 | 7/2016 | De Foy et al. | |
| 2016/0352564 A1 | 12/2016 | Sanda et al. | |
| 2017/0032011 A1 | 2/2017 | Song et al. | |
| 2017/0126552 A1 | 5/2017 | Pfaff et al. | |
| 2018/0041360 A1 | 2/2018 | Shen et al. | |
| 2018/0077064 A1 | 3/2018 | Wang | |
| 2018/0324040 A1* | 11/2018 | Patterson | H04L 41/12 |
| 2018/0331955 A1* | 11/2018 | Ju | H04L 47/41 |
| 2019/0253345 A1* | 8/2019 | Levy | H04L 49/254 |
| 2019/0297520 A1* | 9/2019 | Vedam | H04L 47/83 |
| 2020/0007448 A1 | 1/2020 | Mizrahi et al. | |
| 2020/0067792 A1 | 2/2020 | Aktas et al. | |
| 2020/0092399 A1* | 3/2020 | Ramos Chaves | H04L 41/0893 |
| 2020/0336431 A1 | 10/2020 | Lessmann et al. | |
| 2020/0379968 A1 | 12/2020 | Mammen et al. | |
| 2022/0237163 A1 | 7/2022 | Mammen et al. | |

OTHER PUBLICATIONS

Office Action for U.S. Appl. No. 16/563,122, mailed on Sep. 14, 2021, Mammen, "Selecting Interfaces for Device-Group Identifiers", 18 Pages.

Office Action for U.S. Appl. No. 16/563,122, mailed on Dec. 15, 2020, Mammen, "Selecting Interfaces for Device-Group Identifiers", 18 Pages.

Office Action for U.S. Appl. No. 17/717,340, mailed on Sep. 15, 2022, Mammen, "Selecting Interfaces for Device-Group Identifiers", 10 pages.

International Report on Preliminary Patentability for PCT Application No. PCT/US20/35207, mailed Dec. 9, 2021.

PCT Search Report and Written Opinion mailed Oct. 2, 2020 for PCT application No. PCT/US20/35207, 14 pages.

* cited by examiner

SELECTING INTERFACES FOR DEVICE-GROUP IDENTIFIERS

RELATED APPLICATIONS

This application is a continuation of and claims priority to U.S. patent application Ser. No. 17/717,340, filed Apr. 11, 2022, which is a continuation of and claims priority to U.S. patent application Ser. No. 16/563,122, filed Sep. 6, 2019, now U.S. Pat. No. 11,334,546, issued May 17, 2022, which claims priority to U.S. Provisional Patent Application No. 62/855,859, filed May 31, 2019, the entirety of which are incorporated herein by reference.

TECHNICAL FIELD

The present disclosure relates generally to techniques for selecting interfaces for device-group identifiers in a way that distributes the identifiers across the interfaces while minimizing the need to move connections if interfaces fail or if new interfaces are brought online.

BACKGROUND

In today's digital world, more and more service providers manage and provide computing resources to users to fulfill needs of the users without the users having to invest in and maintain their own computing infrastructure. For example, cloud computing often involves the use of networks of data centers which house servers, routers, and other devices that provide computing resources to users such as compute resources, networking resources, storage resources, database resources, application resources, and so forth. Users may be allocated portions of the computing resources, including portions of one or more host servers that may provide compute functionality and one or more target servers that may provide storage for use by the host servers.

Within such data-center architectures, communications between computing devices are often routed through an array of switches, routers, and other computer networking devices. In some instances, these communications comprise group communications that are addressed to groups of destination computing devices. In order to balance load across the components of the architecture, different device-group identifiers may be assigned to different interfaces along which respective communications travel. Further, in order to balance load, these techniques may reassign interfaces to the device-group identifiers in response to interfaces failing or new interfaces coming online. However, some of these reassignments may unnecessarily move traffic associated with device-group identifiers from still-functioning interfaces to other interfaces in the architecture.

Therefore, while techniques exist for assigning device-group identifiers to respective interfaces for balancing load in a data-center architecture, it may be advantageous to balance this load in a manner that does not unnecessarily interrupt the assignment of device-group identifiers to functioning interfaces.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
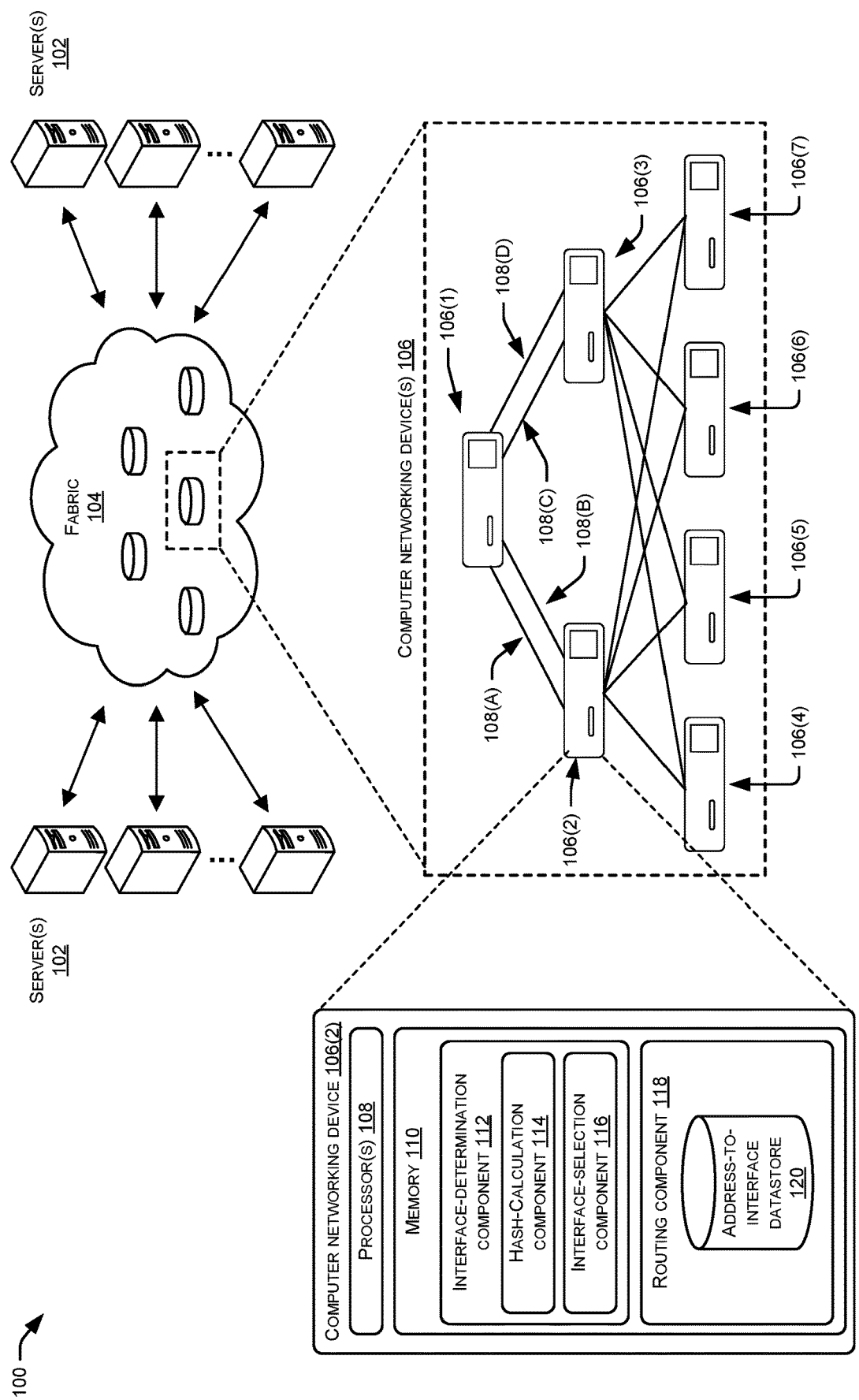
FIG. 1 illustrates a system-architecture diagram of an example environment in which computer networking devices route traffic, such as multicast traffic, within a computing fabric. In order to route this multicast or other point-to-multipoint traffic, the computer networking devices may assign different multicast addresses to different external interfaces. As described below, the computer networking devices may make these assignments in a manner that balances load across the available interfaces while avoiding unnecessary reassignment of multicast addresses from functioning interfaces to other interfaces.

This disclosure describes, in part, a computer networking device configured to calculate a first hash value for an identifier of a group of computing devices, the first hash value being at least in part on the identifier of the group of computing devices and an identifier of a first interface. In addition, the computer networking device may be configured to calculate a second hash value for the identifier of the group of computing devices, the second hash value being at least in part on the identifier of the group of computing devices and an identifier of a second interface. The computer networking device may be configured to analyze the first hash value with respect to the second hash value and select the first interface for association with the identifier of the group of computing devices based at in part on the analyzing. The computer networking device may further be configured to store an indication that the identifier of the group of computing devices is associated with the first interface.

Additionally, the techniques described herein may be performed via a method and/or non-transitory computer-readable media storing computer-executable instructions that, when executed by one or more processors, performs methods described herein.

EXAMPLE EMBODIMENTS

Typical data-center architectures include interconnected computer networking devices (e.g., switches, routers, etc.) configured to route immense amount of traffic to other devices in the architecture. This traffic may include multicast traffic or other communications specifying respective identifiers of groups of computing devices. In some instances, these data-center architectures (e.g., leaf-and-spine architectures, three-tier architectures, etc.) include pods in which lower-level computer networking devices couple to higher-level computer networking devices. For example, in a leaf-and-spine architecture, a pod may include several "leaf" switches, each coupled to a "spine" switch, which in turn couples to a router for communicatively coupling this pod to other pods in the architecture. In some instances, each spine in a pod couples to the router via one or more interfaces (e.g., external interfaces") such that all traffic originating from beneath the spine is routed onto one or more of these interfaces.

In order to enable efficiently communication within and across large data-center architectures, these architectures may enable devices to send messages to respective addresses that each identify a potentially large number of subscribing devices. For example, such an architecture may implement multicast addresses, each of which represents a logical identifier for a group of server computing devices in a network. In order to enable leaf devices in such an architecture to send and receive multicast or other multi-device communications, these architectures may associate each multicast route to a respective interface between a spine of the pod and the router of the pod. For example, if the architecture enables ten example multicast routes, and if the pod of the architecture includes four interfaces from spine(s) of the pod to the router of the pod, the architecture may assign each of the ten multicast routes to one of the four available interfaces. In some instances, the architecture may do so in a manner that relatively balances the load across the interfaces. In the instant example, for instance, the architecture may balance the load such that each of the four interfaces routes (e.g., sends and receives) traffic to and from two or three of the example ten multicast routes.

Existing algorithms for assigning multicast routes to external interfaces attempt to balance this load by evenly distributing routes across available interfaces. However, when an interface fails or otherwise becomes unavailable, or when a new interface is made available, existing algorithms may re-associate routes to interfaces in a manner that disrupts traffic associated with multicast routes that are associated with functioning links. Stated otherwise, when an interface goes down or a new interface becomes available, the existing algorithms may reshuffle a relatively large amount of route-to-interface assignments such that otherwise unaffected routes—e.g., those that are currently associated with a functioning interface—are moved to a new interface. Given that moving a route from one interface to another requires reprogramming at the spine, movement of these route-to-interface assignments may result in unnecessary traffic loss and computational expense.

Thus, this disclosure describes techniques for assigning multicast (and other multi-destination) routes to interfaces in a manner that both balances load across the interfaces and that minimizes unnecessary movement of routes currently associated with functioning interfaces.

Continuing the example from above, envision a scenario where one or more computer networking devices, such as "spine" devices, are configured to assign one of four available interfaces to each of ten respective identifiers of computing device groups. That is, envision a scenario where a first spine is associated with two interfaces (e.g., $IF_A$ and $IF_B$), a second spine is associated with two interfaces (e.g., $IF_C$ and $IF_D$), and each spine is configured to determine which available interface is to be assigned to an identifier of a first group of computing devices (e.g., a first multicast route), an identifier of a second group of computing devices (e.g., a second multicast route), and so forth. In order to do so, each spine may compute a hash value for each combination of each device-group identifier (e.g., multicast route) and available interface and may use these hash values to select an interface to assign to each device-group identifier.

In the example above, for instance, each spine may compute, for an identifier of a first group of computing devices, a first hash value based on an available first interface, a second hash value based on an available second interface, a third interface based on an available third interface, and a fourth hash value based on an available fourth interface. The spine may then analyze these four hash values relative to one another for selecting which of the four interfaces to assign to the identifier of the first group of devices. In one example, the spine may select the interface associated with a highest hash value.

In one example, the spine may generate hash values based on an identifier of the respective group of computing devices, an identifier of the particular interface, and an identifier of the spine associated with the particular interface. Continuing the example from above, for instance, each spine may generate, for the identifier of the first group of computing devices ($ID_1$), the following four hash values:

$Hash\_Value_1 = hash\_fnc(ID_1, <Spine_1, IF_A>)$
$Hash\_Value_2 = hash\_fnc(ID_1, <Spine_1, IF_B>)$
$Hash\_Value_3 = hash\_fnc(ID_1, <Spine_2, IF_C>)$
$Hash\_Value_4 = hash\_fnc(ID_1, <Spine_2, IF_D>)$ After computing each of the four hash values for the identifier of the first group of computing devices, each spine may rank the values relative to one another and may determine which hash value is the highest value of the four values and may associate the interface associated with this highest hash value to the identifier of the first group of computing devices. Further, the spine associated with the selected interface may set up the connection such that communications sent to or from this device-group identifier are routed through the selected interface. For example, if each of the two spines determines that the identifier of the first group of computing devices ($ID_1$) is to be associated with the first ($IF_A$) or second interfaces ($IF_B$), then the first spine may configure the connection. If, however, the spines determine that $ID_1$ is to be associated with the third ($IF_C$) or fourth interfaces ($IF_D$), then the fourth spine may configure the connection.

In addition, the spines may determine which interface is associated with a second highest hash value and may store an indication that this interface is to be a backup interface in the event that the primary interface (i.e., the selected interface) fails. Further, the interface associated with the third highest hash value may function as a backup to the backup interface and so forth.

Thus, continuing the example from above, envision that the two spines have computed hash values, in the manner described above, and selected interfaces for the following ten device-group identifiers: $ID_1$, $ID_2$, $ID_3$, $ID_4$, $ID_5$, $ID_6$, $ID_7$, $ID_8$, $ID_9$, and $ID_{10}$. Further, envision that the spines have assigned the interfaces to the device-group identifiers as follows:

$ID_1 \Rightarrow IF_D$
$ID_2 \Rightarrow IF_B$
$ID_3 \Rightarrow IF_C$
$ID_4 \Rightarrow IF_D$
$ID_5 \Rightarrow IF_A$
$ID_6 \Rightarrow IF_A$
$ID_7 \Rightarrow IF_C$
$ID_8 \Rightarrow IF_B$
$ID_9 \Rightarrow IF_A$
$ID_{10} \Rightarrow IF_D$ In this example, if the fourth interface ($IF_D$) were to fail, the device-group identifiers associated with this failed interface may transition to one or more other interfaces, while the remaining device-group identifiers may remain associated with their current, respective interface. In the above example, for instance, the identifiers $ID_1$, $ID_4$, and $ID_{10}$ may transition from the fourth interface to an interface having a second highest hash value for each respective device-group identifier. That is, each spine may determine the interface that is associated with the previously calculated second-highest hash value for the first device-group identifier and may associate that interface with the first device-group identifier. Similarly, each spine may determine these respective "backup" interfaces for the fourth and tenth device-group identifiers and may configure the respective interfaces for these device-group identifiers.

It is to be appreciated, however, that upon an interface failing, the techniques described herein do not require that device-group identifiers (e.g., multicast routes) associated with non-affected interfaces are not re-routed to different interfaces in response to the example interface failing. That is, despite the fourth interface becoming unavailable in the above example, each of the ten device-group identifiers whose communications are not routed through the fourth interface continues to be associated with their interface. Instead, only the three affected device-group identifiers (i.e., those identifiers that are were associated with the failed interface) are moved to new interfaces. Thus, the techniques described herein greatly lessen the traffic loss and computational expense resulting from moving relatively large numbers of device-group identifiers upon failure of an interface.

In another example, one or more new interfaces may become available, such as when an interface is added to an existing spine or when a new spine "comes online". In these example, each spine may compute, for each device-group identifier, a hash value based on an identifier of the new interface(s). For instance, if the second spine in the example from above adds a fifth interface (a third for the second spine), IFS, each spine may now calculate an additional hash value for each of the ten device-group identifiers. Further, each spine may determine whether the new hash value represents the largest of the set of (now) five hash values and, if so, may store an indication that the respective device-group identifier is to be associated with the fifth interface and a corresponding path may be configured for the device-group identifier. For each device-group identifier whose highest hash value is not associated with the fifth interface, meanwhile, the existing association may persist.

Again, it is to be appreciated that the techniques may generally load-balance the device-group identifiers (e.g., multicast routes), while limiting the circumstances in which device-group identifiers currently associated with functioning interfaces are to be moved. Thus, the techniques described herein minimize traffic loss as well as computational costs associated with setting up and tearing down communication paths for device-group identifiers, such as multicast routes.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 that includes one or more servers 102 in a network coupled by a fabric 104 of the network, representing one or more computer networking devices 106. The computer networking device 106 may comprise an array of one or more devices, such as gateways, routers, network bridges, modems, wireless access points, networking cables, line drivers, switches, hubs, protocol converters, servers, firewalls, network address translators, multiplexers, network interface controllers, wireless network interface controllers, terminal adapters, and/or the like.

In some examples, the environment 100 comprises a data center or cloud-computing network comprising servers and other network components (e.g., routers, switches, etc.) stored across multiple data centers located across geographic areas. In these instances, the cloud-computing environment may be a distributed network through which users (often customers) may interact via user devices to manage or otherwise interact with service provided by the cloud computing network. The cloud computing network may provide on-demand availability of computing system resources, such as data storage, computing power (e.g., CPU, GPU, etc.), networking, databases, etc., without direct active management by users. In some examples, the cloud computing network may be managed and maintained by a service provider such that users do not have to invest in and maintain the computing infrastructure for their computing resource needs. Generally, a user may be provided access to, or allocated use of, a portion of the computing resources in the cloud computing network. The cloud computing network may scale, such as by spinning up resources or spinning down resources, based on demand for the individual users. The portions of the cloud computing network may be allocated using hardware virtualization such that portions of the cloud computing network can be configured and managed by the user (e.g., security configuration, load balancing configuration, etc.). However, the cloud computing network need not be managed by a service provider, and can be managed by any entity, including the user themselves that run the applications or services.

As illustrated, in some instances the computer networking devices 106 may be arranged, at least in part, in a multi-tier architecture, such a three-tier architecture, a leaf-and-spine architecture, and/or the like. In the illustrated example, the computer networking device 106 may include a first computer networking device 106(1) (or "router 106(1)") coupled to a second computer networking device 106(2) (or a "first spine 106(2)") and a third computer networking device 106(3) (or a "second spine 106(3)"). The first spine 106(2) may send and receive traffic to and from the router 106(1) via a first interface 108(A) and a second interface 108(B). The second spine 106(3), meanwhile, may send and receive traffic to and from the router 106(1) via a third interface 108(C) and a fourth interface 108(D).

Furthermore, the first spine 106(2) and the second spine 106(3) may couple to a fourth computing networking device 106(4) (or "first leaf 106(4)"), a fifth computing networking device 106(5) (or "second leaf 106(5)"), a sixth computing networking device 106(6) (or "third leaf 106(6)"), and a seventh computing networking device 106(7) (or "fourth leaf 106(7)"). It is to be appreciated that while this example is described with reference to illustrated leaf-and-spine architecture, the techniques may apply to other multi-tier architectures with any other number of computer networking devices.

FIG. 1 further illustrates components of the first spine 106(2). It is to be appreciated that the second spine 106(2) and, potentially, other computer networking devices 106 may include the same or similar components. As illustrated, the first spine 106(2) may include one or more hardware processors 108 and memory 110 (e.g., non-transitory computer-readable media). The processors 108 may be configured to execute one or more stored instructions and may comprise one or more cores. The memory 110, meanwhile may store one or more operating systems that generally support basic functions of the first spine 106(2), as well as an interface-determination component 112 and a routing component 118.

The interface-determination component 112 is configured to determine, for each of multiple device-group identifiers, which interface is to be assigned to the respective device-group identifier. For example, the interface-determination component 112 may be configured to determine which of the four illustrated interfaces 108(A)-(D) is to be assigned to an identifier of a first group of computing devices (e.g., a first multicast "route" or "address"), which of the four illustrated interfaces 108(A)-(D) is to be assigned to an identifier of a second group of computing devices (e.g., a second multicast "route" or "address"), and so forth. In some instances, the interface-determination component 112 may make these determinations by computing one or more hash values for each of the device-group identifiers and analyzing these hash values relative to one another, as described below.

As illustrated, the interface-determination component 112 may include a hash-calculation component 114 and an interface-selection component 116. The hash-calculation component 114 may be configured to generate one or more hash values for each of the device-group identifiers, which the interface-selection component 116 may analyze for selecting an interface for each device-group identifier. In some examples, the hash-calculation component 114 may generate a hash value for each combination of each device-group identifier and each interface. For example, in an example where there are ten device-group identifiers (and the four illustrated interfaces 108(A)-(D)), the hash-calculation component 114 may generate four hash values per device-group identifier, for a total of forty hash values. In some instances, the hash-calculation component 114 may use a predefined hash function to generate a hash value for each device-group identifier based at least in part on one or more of the respective device-group identifier, an identifier of a respective interface, and an identifier of a respective spine associated with the respective interface. For example, in the illustrated example of two spines each associated with two interfaces, the hash-calculation component may calculate the following hash values for a number of "N" device-group identifiers (e.g., multicast routes):

Device-Group Identifier$_1$ (ID$_1$):
  Hash_Value$_1$=hash_fnc(ID$_1$, <Spine$_1$, IF$_A$>);
  Hash_Value$_2$=hash_fnc(ID$_1$, <Spine$_1$, IF$_B$>);
  Hash_Value$_3$=hash_fnc(ID$_1$, <Spine$_2$, IF$_C$>); and
  Hash_Value$_4$=hash_fnc(ID$_1$, <Spine$_2$, IF$_D$>).

Device-Group Identifier$_2$ (ID$_2$):
  Hash_Value$_1$=hash_fnc(ID$_2$, <Spine$_1$, IF$_A$>);
  Hash_Value$_2$=hash_fnc(ID$_2$, <Spine$_1$, IF$_B$>);
  Hash_Value$_3$=hash_fnc(ID$_2$, <Spine$_2$, IF$_C$>); and
  Hash_Value$_4$=hash_fnc(ID$_2$, <Spine$_2$, IF$_D$>).

***

Device-Group Identifier$_N$ (ID$_N$):
  Hash_Value$_1$=hash_fnc(ID$_N$, <Spine$_1$, IF$_A$>);
  Hash_Value$_2$=hash_fnc(ID$_N$, <Spine$_1$, IF$_B$>);
  Hash_Value$_3$=hash_fnc(ID$_N$, <Spine$_2$, IF$_C$>); and
  Hash_Value$_4$=hash_fnc(ID$_N$, <Spine$_2$, IF$_D$>).

The interface-selection component 116, meanwhile, may receive the hash values generated by the hash-selection component 114 and may select, for each device-group identifier, an interface to associate with the device-group identifier. For example, the interface-selection component 116 may compare each of the four respective hash values to one another for selecting an interface. In one example, the interface-selection component 116 is configured to rank the hash values from largest to smallest and select the interface associated with the largest hash value as the interface over which traffic to and from the respective device-group identifier is to be routed. Further, the interface associated with the second-largest hash value may comprise a backup interface for the device-group identifier, such that traffic to and from the device-group identifier is routed through the backup interface in instances where the selected (or "primary") interface fails.

The routing component 118, meanwhile, may be configured to route traffic to the respective device-group identifiers according to the interfaces selected by the interface-selection component 116. In some instances, the routing component 118 stores the indications of which interfaces are associated with which device-group identifiers in an address-to-interface datastore 120, discussed in further detail below with reference to FIG. 2. Further, the routing component 118 may be configured to program each respective spine and interface according to the selected interface/device-group ID pairings.

In some instances, however, one or more interfaces within the illustrated pod may fail, while in other instances one or more interfaces may become available. In each instance, the interface-selection component 116 may be configured to select interfaces for each device-group identifier in a way that balances load across the interfaces while minimizing the amount of traffic loss and programming associated with moving device-group identifiers across interfaces. For example, in instances where an interface fails, the interface-selection component 116 may be configured to determine which of the device-group identifiers are currently associated with the failed interface. That is, the interface-selection component 116 may determine those device-group identifiers whose traffic was being routed via the failed interface. The interface-selection component may then determine, for each of these identified device-group identifiers, the backup interface (e.g., the interface associated with the second-highest hash value, as calculated and ranked above). The interface-selection component 116 may then provide this information to the routing component 118, which may enable the interfaces to receive the traffic from the affected device-group identifiers and may update the datastore 120.

It is noted, however, that the algorithm executed by the interface-selection components results in the device-group identifiers whose traffic was not being routed via the failed interface maintaining their current interface. That is, those device-group identifiers associated with still-healthy interfaces continue to route traffic through these interfaces, thus minimizing the traffic loss and computational expense associated with re-routing this traffic to new interface(s).

In other instances, meanwhile, one or more new interfaces may become available, such as in instances where a new spine comes online or an interface is added to an existing spine. In these instances, in response to receiving an indication that a new interface is available, the hash-calculation component 114 may generate, for each of the "N" device-group identifiers, a hash value associated with the new interface. Again, these respective hash values may be based on one or more of the device-group identifier, an identifier of the new interface, and an identifier of the spine associated with the new interface.

Upon generating the new hash value for each device-group identifier (or multiple hash values if multiple interfaces become available), the interface-selection component may determine whether the new hash value is the largest for any of the device-group identifiers. If so, then the interface-selection component 116 may provide an indication to the routing component 118, which may move traffic associated with these device-group identifier(s) to the new interface and may correspondingly update the datastore 120. Further, if the new interface is not associated with the highest hash value, but is associated with the second- or third-highest hash value, the interface-selection component 116 may provide this indication to the routing component 118 which update the backup interface or the like in the datastore 120.

Figure 2:
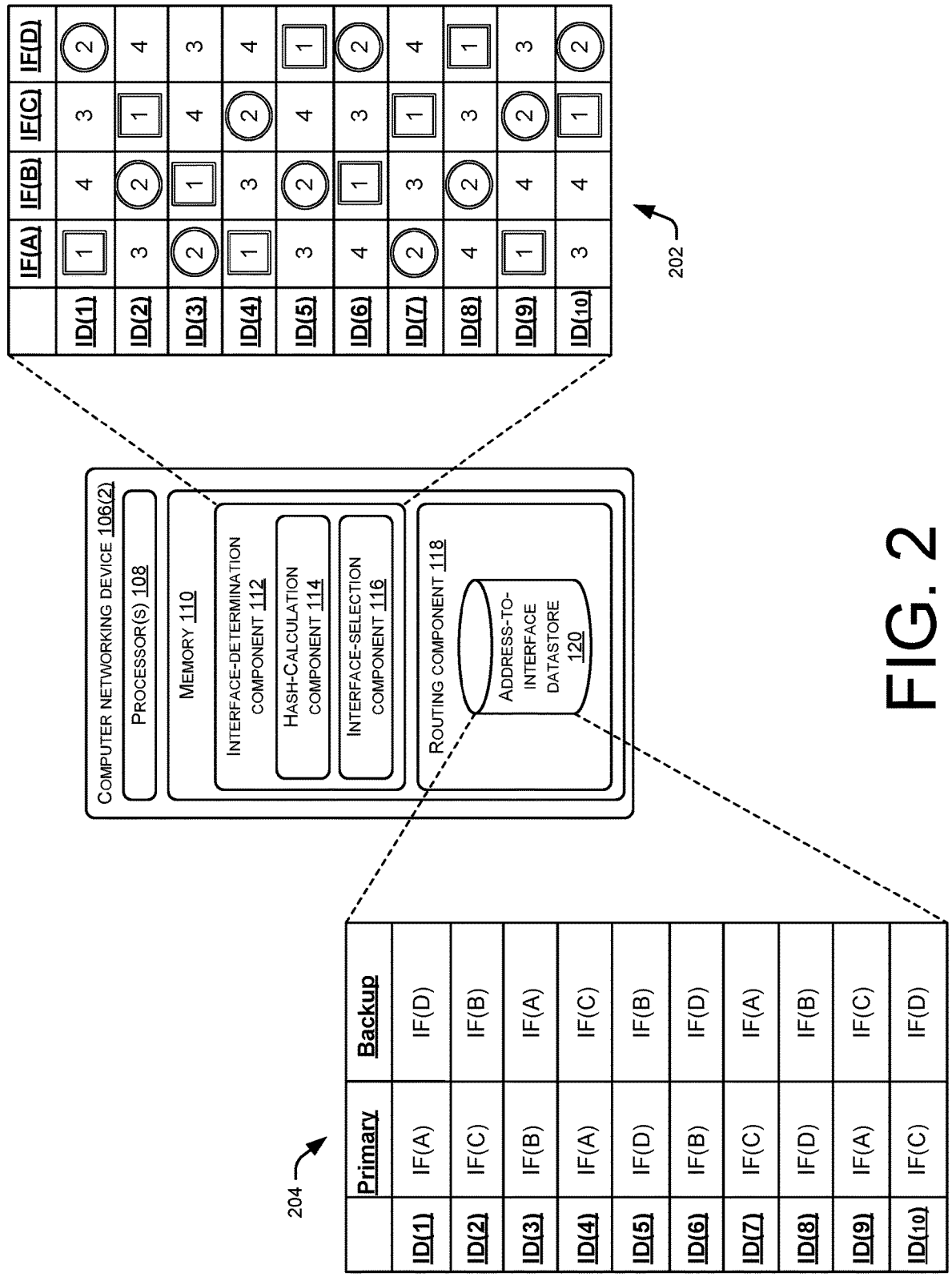
FIG. 2 illustrates an example in which an interface-assignment component, executing on a computer networking device of FIG. 1, calculates, for each of ten example device-group identifiers (e.g., multicast addresses), a respective hash value using the respective device-group identifier and an identifier of each of four example external interfaces. As illustrated, the interface-assignment component may then rank, for each device-group identifier, the hash values for determining which interfaces to assign to which device-group identifiers. In one example, an interface associated with a highest hash value is assigned to a respective device-group identifier, while an interface associated with a second-highest hash value is assigned as a backup interface for the respective device-group identifier.

FIG. 2 illustrates an example of the techniques described above. As illustrated, the hash-calculation component 114 may calculate, for each of ten device-group identifiers (e.g., multicast routes), a hash value for each of the four available interfaces, as described above. The interface-selection component 116, meanwhile, may rank these hash values from one to four for each of the ten device-group identifiers. Again, it is to be appreciated that both the number of device-group identifiers and available interfaces are illustrative and other may include more and/or fewer of each.

FIG. 2 illustrates a ranking 202 of each of the hash values for each of the device-group identifiers. As illustrated, for an identifier of a first group of computing devices ("ID(1)"), a hash value associated with the interface 108(A) ("IF(A)") was the highest hash value, followed by a hash value associated with the interface 108(D) ("IF(D)"), followed by a hash value associated with the interface 108(C) ("IF(C)"), followed by a hash value associated with the interface 108(B) ("IF(B)"). Thus, in this example, the interface 108(A) may be used as the interface for routing communications to and from the pod, while the interface 108(D) may be designated at the backup interface. It is to be appreciated that FIG. 2 illustrates each primary interface (the interface over which traffic for a given device-group identifier is to be routed) with a square, while illustrating each backup interface with a circle.

Given the example ranking, the interface-selection component 116 may determine the following associations between device-group identifiers and available interfaces:
ID(1)⇒Interface 108(A);
ID(2)⇒Interface 108(C);
ID(3)⇒Interface 108(B);
ID(4)⇒Interface 108(A);
ID(5)⇒Interface 108(D);
ID(6)⇒Interface 108(B);
ID(7)⇒Interface 108(C);
ID(8)⇒Interface 108(D);
ID(9)⇒Interface 108(A); and
ID(10)⇒Interface 108(C).

In addition, the interface-selection component 116 may determine the following associations between the device-group identifiers and the available interfaces that are to be designed as backup interfaces for the device-group identifiers:
ID(1)⇒Interface 108(D);
ID(2)⇒Interface 108(B);
ID(3)⇒Interface 108(A);
ID(4)⇒Interface 108(C);
ID(5)⇒Interface 108(B);
ID(6)⇒Interface 108(D);
ID(7)⇒Interface 108(A);
ID(8)⇒Interface 108(B);
ID(9)⇒Interface 108(C); and
ID(10)⇒Interface 108(D).

Based on the above example ranking 202, the routing component may store, in the datastore, respective indications 204 of a primary interface and a backup interface for each device-group identifier. Further, the routing component 118 may configure the interfaces 108(A)-(D) on the respective spines 106(2) and 106(3) to send and receive data traffic according to the indications 204.

Figure 3:
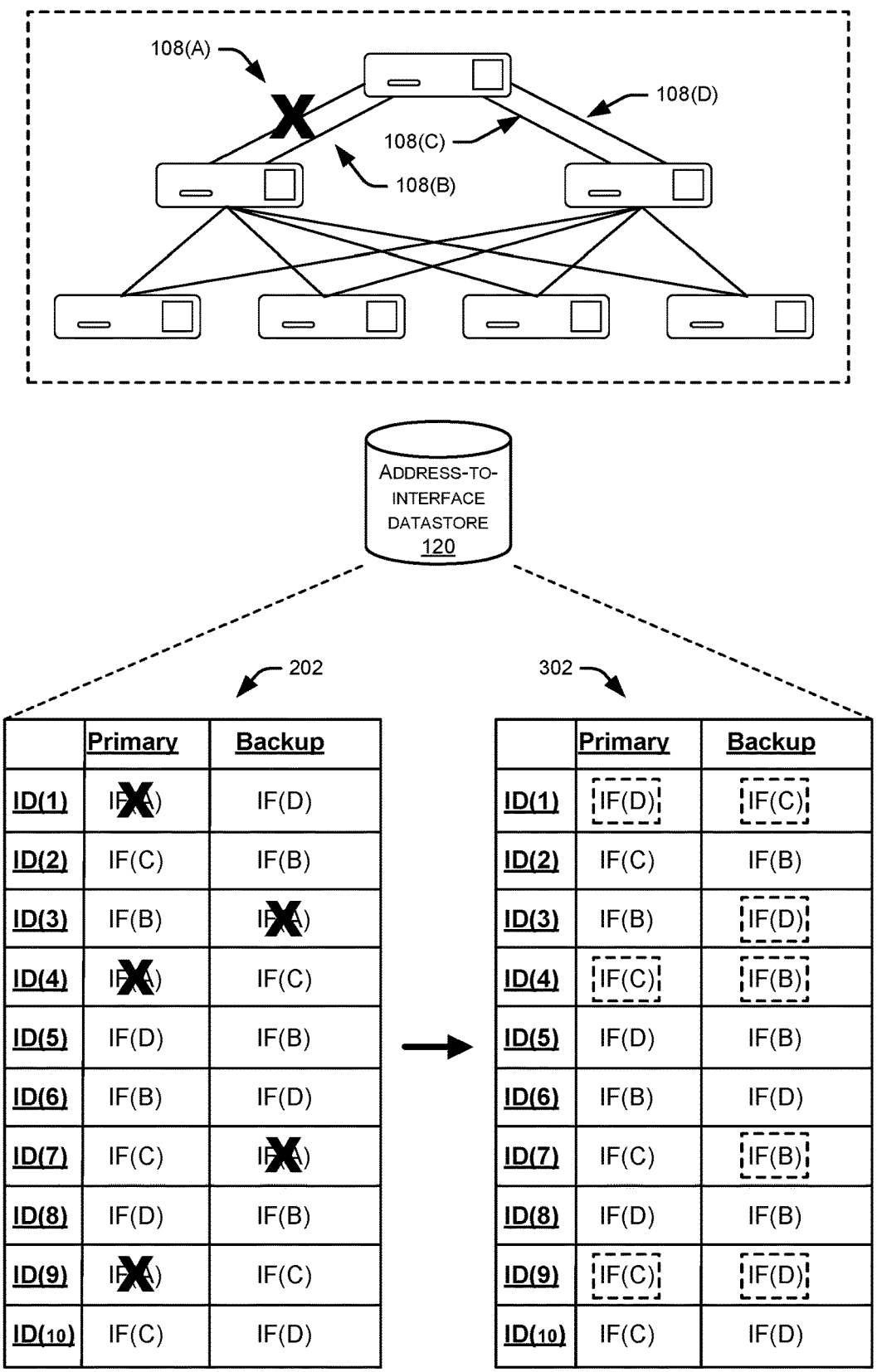
FIG. 3 illustrates an example scenario where one of the four example interfaces fails, thus resulting in a need to re-route traffic from device-group identifiers assigned to the failed interface to one or more other interfaces. In this example, the computer networking devices identify those device-group identifiers currently assigned to the failed interface and, for each of these identified device-group identifiers, identify a backup interface. The computer networking devices thereafter assign the identified device-group identifiers to their respective backup interfaces, while refraining from moving non-affected device-group identifiers from still-functioning interfaces.

FIG. 3 illustrates an example scenario where one of the four example interfaces fails, thus resulting in a need to re-route traffic from device-group identifiers assigned to the failed interface to one or more other interfaces. In this example, the interface 108(A) has failed. In response, the interface-determination component 112 may determine (e.g., from the datastore 120) those device-group identifiers whose traffic is currently being routed through the failed interface 108(A). In this example, the interface-determination component 112 may determine that the following three of the ten example device-group identifiers are currently associated with the interface 108(A): ID(1), ID(4), and ID(9).

In response, the interface-determination component 112 may determine that the previously listed backup interface (e.g., the interface associated with a second-highest hash value) is to become the primary interface—or the interface over which traffic to and from these device-group identifiers is to be routed. For example, the interface-determination component 112 may determine that the identifier of the first group of computing devices (ID(1)) is to now be associated with the interface 108(D), the identifier of the fourth group of computing devices (ID(4)) is to be now be associated with the interface 108(C), and the identifier of the ninth group of computing devices (ID(9)) is to now be associated with the interface 108(C).

In response to receiving this information, the routing component 118 may configure the interfaces (and, thus, the spines) to being receiving and sending traffic for these respective device-group identifiers. In addition, the routing component 118 may update the datastore 120 to indicate the new address-to-interface associations. In addition, the routing component 118 may update the datastore 120 to indicate the new backup interfaces for these device-group identifiers. That is, the respective interfaces associated with the third-highest hash value may now be designated as the backup interfaces. For example, the routing component 118 may indicate that the interface 108(C) is now the backup interface for the identifier of the first group of computing devices, the interface 108(B) is now the backup interface for the identifier of the fourth group of computing devices, and the interface 108(D) is now the backup interface for the identifier of the ninth group of computing devices.

Furthermore, the interface-determination component 112 and/or the routing component 118 may determine those device-group identifiers whose backup interfaces corresponded to the now-failed interface 108(A). In this example, the component 112 or the component 118 may determine that the identifier of the third group of computing devices (ID(3)) and the identifier of the seventh group of computing devices (ID(7)) designate the interface 108(A) as the backup interface. Thus, while these device-group identifiers need not be changed from their current interface, the routing component 118 may update the datastore 120 to indicate the new backup interfaces (interfaces 108(D) and 108(B), respectively).

Figure 4A:
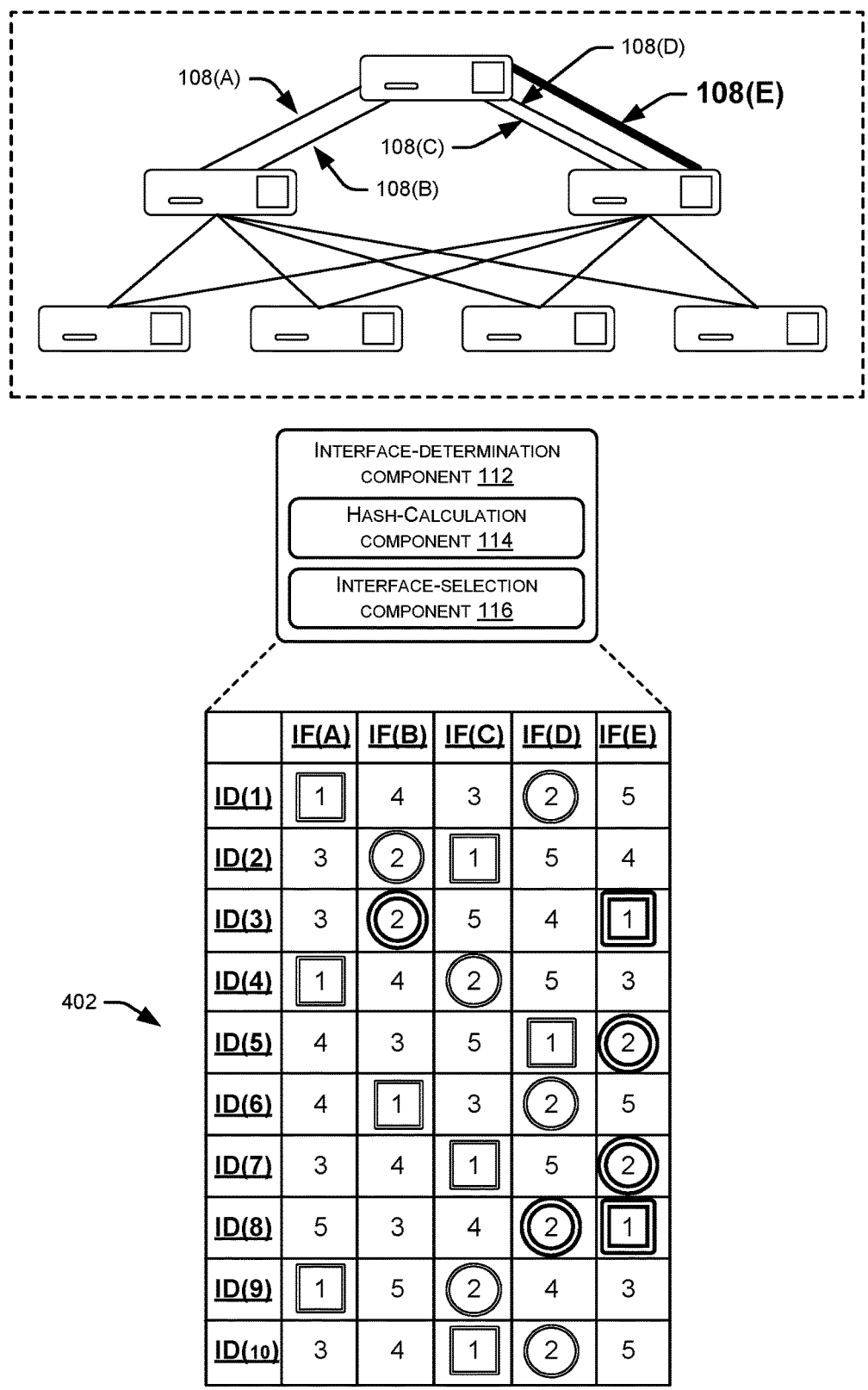
FIGS. 4A-B collectively illustrate an example scenario where a new interface for routing group (e.g., multicast) communications becomes available. In this example, the computer networking devices may generate, for each of the ten example device-group identifiers, a hash value using the respective device-group identifier and an identifier of the new, fifth interface. The computer networking devices may then identify whether this respective hash value is a greatest hash value (relative to the other four hash values) for any of the device-group identifiers. If so, the computer networking devices may assign the new, fifth interface to these device-group identifiers, while otherwise refraining from altering the assignments of the other device-group identifiers.
Figure 4B:
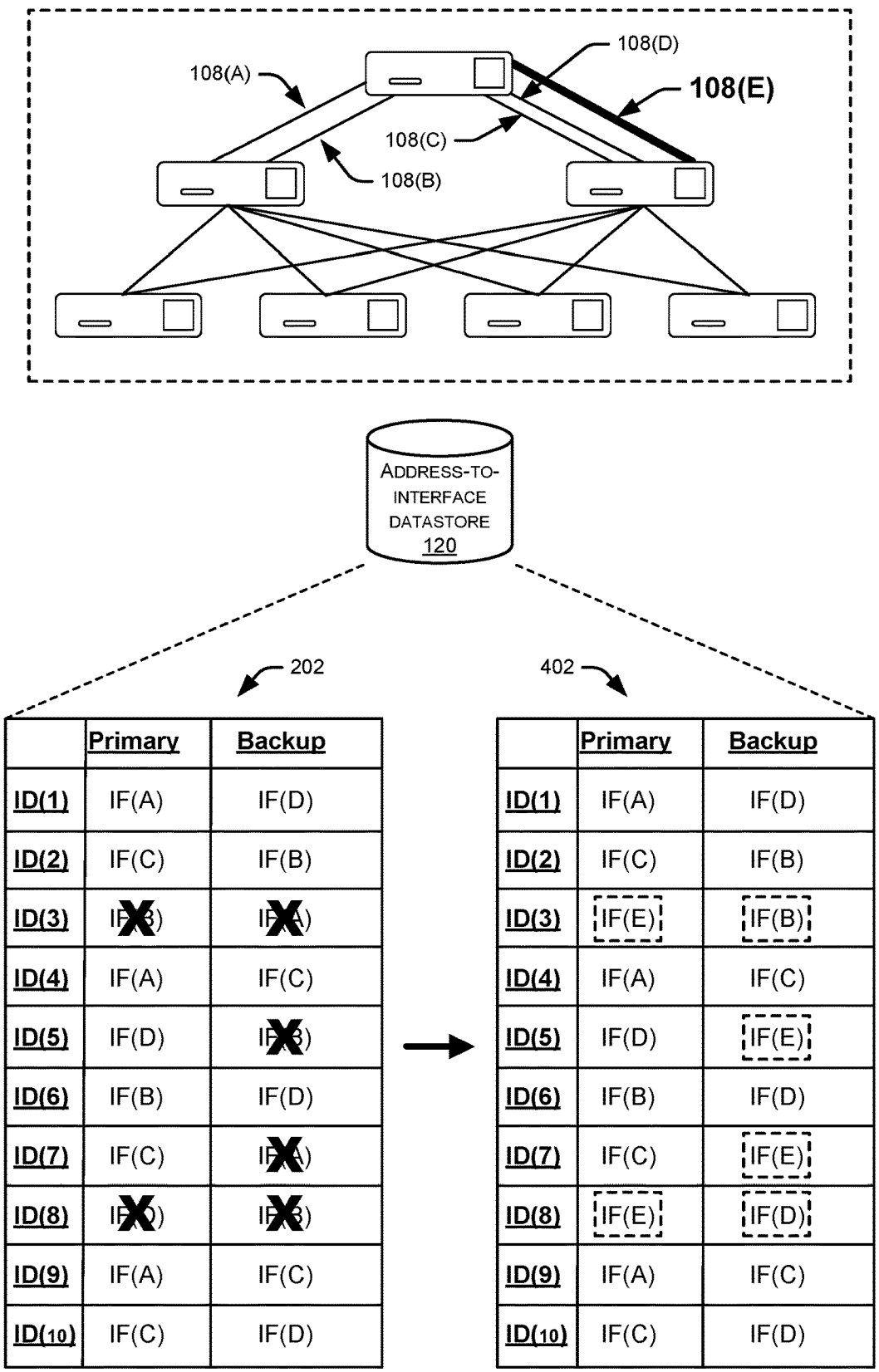

FIGS. 4A-B collectively illustrate an example scenario where a new interface 108(E) for routing group (e.g., multicast) communications becomes available. In response to determining the availability of the interface 108(E), the hash-calculation component 114 may compute, for each device-group identifier, a hash value corresponding to the new interface 108(E). As described above, this hash value may be based on one or more of the respective device-group identifier, an identifier of the interface 108(E), and/or an identifier of the spine 106(3) associated with the interface 108(E). Thereafter, the interface-selection component 116 may generate a re-ranking 402 of the hash values for each of the device-group identifiers or may otherwise determine whether the new hash value is greater than the primary-interface hash value (and, potentially, the backup-interface hash value).

In this example, the new hash value is the fifth-largest hash value for the identifier of the first group of computing devices, the fourth-largest hash value for the identifier of the second group of computing devices, and so forth. Importantly, this new hash value is the largest hash value for the identifier of the third group of computing devices and for the identifier of the eighth group of computing devices. Thus, the interface-selection component 116 may select this new interface 108(E) as the primary interface for these device-group identifiers. The routing component 118 may receive this indication and may re-route traffic from interfaces 108(B) and 108(D), respectively, to the interface 108(E). In addition, the routing component 118 may update the datastore 120 to indicate this change, as well as to indicate that the previous primary interfaces (108(B) and 108(D), respectively) now correspond to backup interfaces in the event of a failure of the interface 108(E).

FIG. 4B illustrates, via stored indications 402, the new association between ID(3) and ID(8) and the new interface 108(E), as well as the change in backup interfaces for these device-group identifiers. Furthermore, the interface-selection component 116 or the routing component 118 may determine that the new hash value is the second-largest hash value for the following device-group identifiers: ID(5) and ID(7). Thus, the routing component has updated the stored indications 402 in the datastore 120 to indicate that the interface 108(E) is to be the backup interface for these device-group identifiers.

Figure 5:
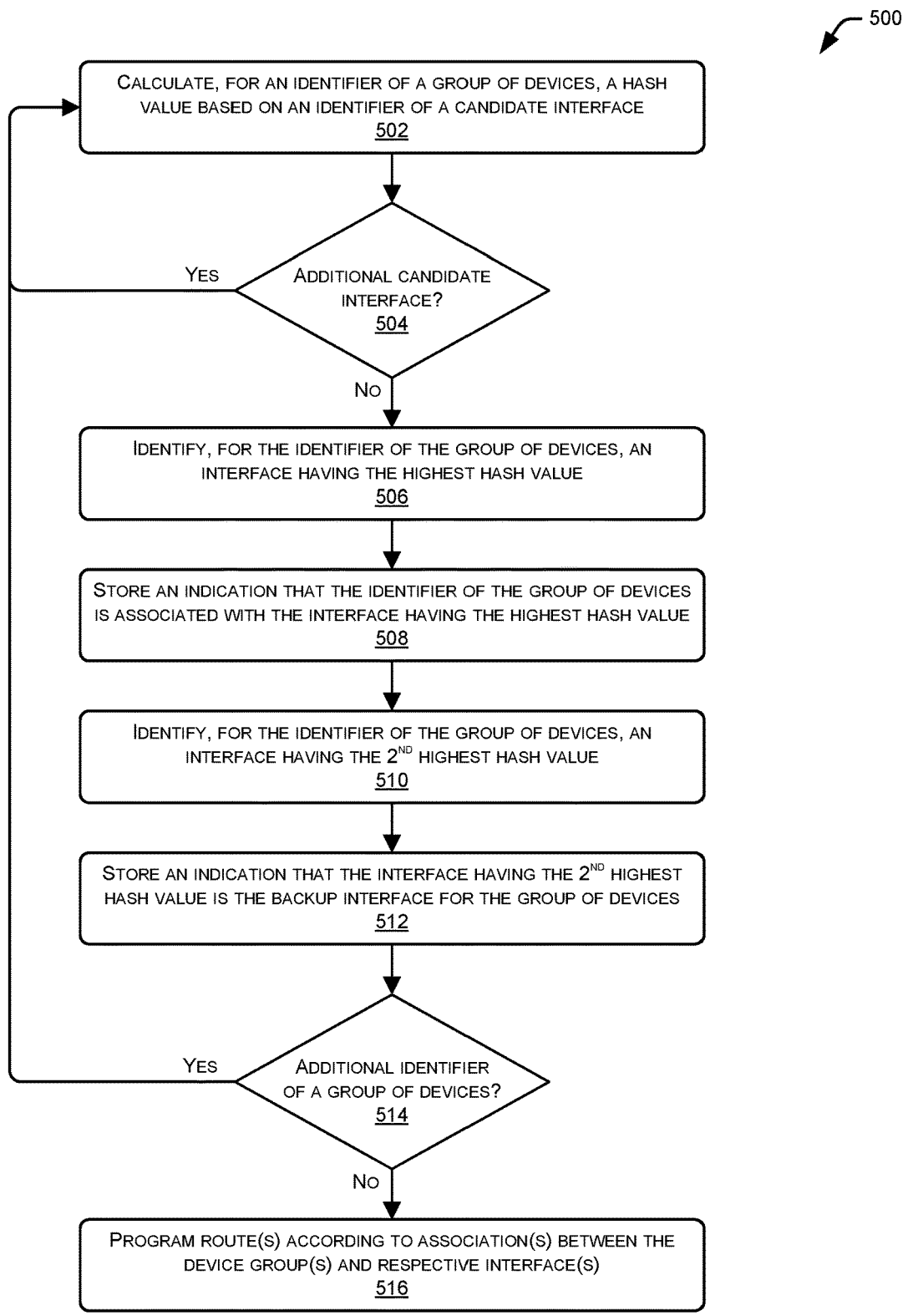
FIG. 5 illustrates a flow diagram of an example method for assigning interfaces to device-group identifiers using the techniques described herein.

FIG. 5 illustrates a flow diagram of an example method 500 for assigning interfaces to device-group identifiers using the techniques described herein. In some instances, the method 500, as well as other described methods, may be performed, in whole or in part, by one or more of the computer networking devices 106 (e.g., the first spine 106(2), the second spine 106(3), etc.).

As illustrated, an operation 502 represents calculating, for an identifier of a group of computing devices (e.g., a multicast address), a hash value based at least in part on an identifier of a candidate interface. As described above, this hash value may also be based at least in part on an identifier of a spine device that maintains the interface and/or the identifier of the group of computing devices.

An operation 504, meanwhile, represents determining whether there is an additional candidate interface. If so, then the process returns to the operation 502 for calculating another hash value for the identifier of the group of computing devices based at least in part on an identifier of the additional candidate interface.

If not, however (e.g., after calculating a hash value for each candidate interface), the method proceeds to identify, at an operation 506 and for the identifier of the group of computing devices, an interface of the candidate interfaces that is associated with the highest hash value. An operation 508 represents storing an indication that this identifier of the group of computing devices is associated with the interface associated with the highest hash value. For instance, this indication may represent that communications to and/or from the identifier of the group of computing devices are to be routed through the indicated interface.

An operation 510, meanwhile, represents identify an interface of the candidate interface that is associated with a second-highest hash value, while an operation 512 represents storing an indication that this interface comprises the backup interface to the primary interface identified at the operation 506. Therefore, this interface that is associated with the second-highest hash value may be used to route communications to and/or from the identifier of the group of computing devices in instances where the primary interface fails (e.g., goes offline, etc.).

An operation 514, meanwhile, represents determining whether there is an additional identifier of a group of computing devices for associating with an interface, such as whether there is an additional multicast address for associating with the a primary and/or backup interface. If so, then the method 500 returns to the operation 502 for selecting a primary and a backup interface via the operations described above. If not, however (e.g., after selecting primary and/or backup interfaces for each identifier of a group of computing devices), then the method proceeds to program, at an operation 516, routes within the architecture according to the associations between the identifiers of the device groups and the respective interfaces.

Figure 6:
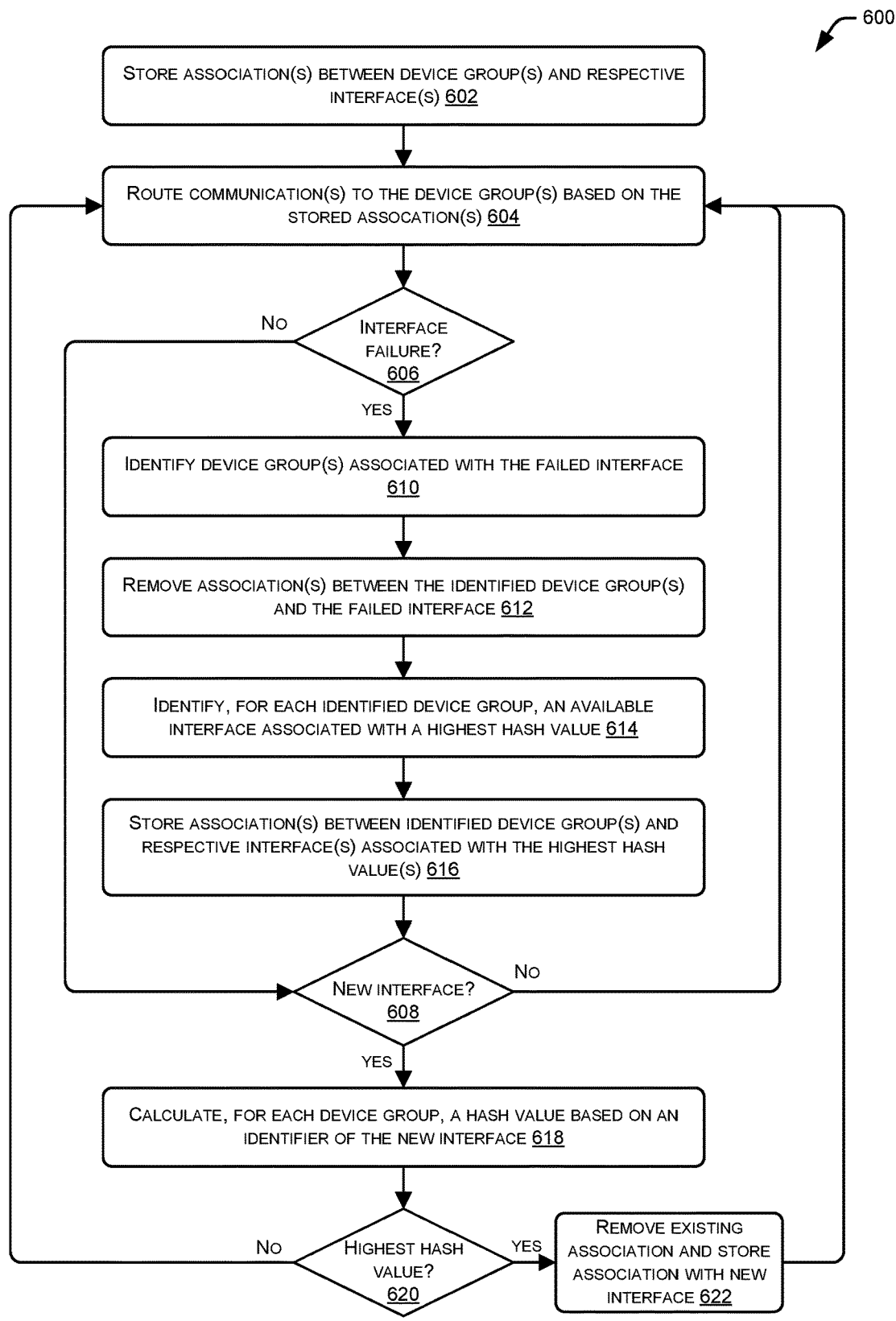
FIG. 6 illustrates a flow diagram of an example method for determining when to reassign interfaces to device-group identifiers in response to interfaces failing and/or new interfaces becoming available using the techniques described herein. As described below, the techniques may reassign interfaces in a way that balances load across the available interfaces without unnecessarily disrupting traffic on still-functioning interfaces.

FIG. 6 illustrates a flow diagram of an example method 600 for determining when to reassign interfaces to device-group identifiers in response to interfaces failing and/or new interfaces becoming available using the techniques described herein. As described below, the techniques may reassign interfaces in a way that balances load across the available interfaces without unnecessarily disrupting traffic on still-functioning interfaces.

An operation 602 represents storing an association between each of one or more device groups and a respective interface. This operation may include, for example, storing an association between an identifier of a first group of computing devices (e.g., a first multicast address) and a primary interface for that group of devices, an association between an identifier of a second group of computing devices (e.g., a second multicast address) and a primary interface for that group of devices, and so forth. An operation 604, meanwhile, represents routing communications to the identifier(s) of the device group(s) according to the stored associations.

At an operation 606, the method 600 determines whether one or more interfaces have failed. If not, then the method may proceed to determine, at an operation 608, whether one or more new interfaces have become available. If not, then the method 600 returns to the operation 604, representing the routing of communications according to the stored associations between the identifiers of the device groups and the associated interfaces.

If, however, the method 600 determines, at the operation 606, that an interface has failed, then at an operation 610 the method may identify any identifiers of device groups associated with the failed interface(s). An operation 612, meanwhile, represents removing an association between each identified device-group identifier and the failed interface. That is, the routing computing 118 may remove, at the corresponding spine, the association between the affected device-group identifier(s) and the failed interface.

An operation 614, meanwhile, represents identifying, for each device-group identifier previously associated with the failed interface, an available interface associated with a highest remaining hash value. That is, the operation 614 represents determining, for each affected device-group identifier, which interface is associated with a highest hash value, excluding the failed interface. In some instances, this operation comprises the routing component 118 accessing the datastore 120 to determine, for each affected device-group identifier, the interface listed as the backup interface. An operation 616 represents storing an association between these device-group identifiers and each respective interface identified at the operation 614.

Returning to the operation 608, this operation represents determining whether a new interface has become available to the device-group identifiers. If so, then an operation 618 represents calculating, for each device-group identifier, a hash value based at least in part on an identifier of the new interface. As described above, this hash value may further be based at least in part on the respective device-group identifier and an identifier of the spine device associated with the new interface.

An operation 620 represents determining whether the new hash value is the highest hash value for any of the device-group identifiers. If so, then an operation 622 represents removing, for each device-group identifier for which the new hash value is the highest hash value, an association between the device-group identifier and its primary interface and storing an association between the device-group identifier and new interface. The method 500 then proceeds to the operation 504, as described above, as it does in instances where the new hash value is not the highest hash value for any of the device-group identifiers. Further, while not illustrated, it is to be appreciated that in some instances the method 500 may further include updating an association between one or more device-group identifiers and a backup interface, as described above.

Figure 7A:
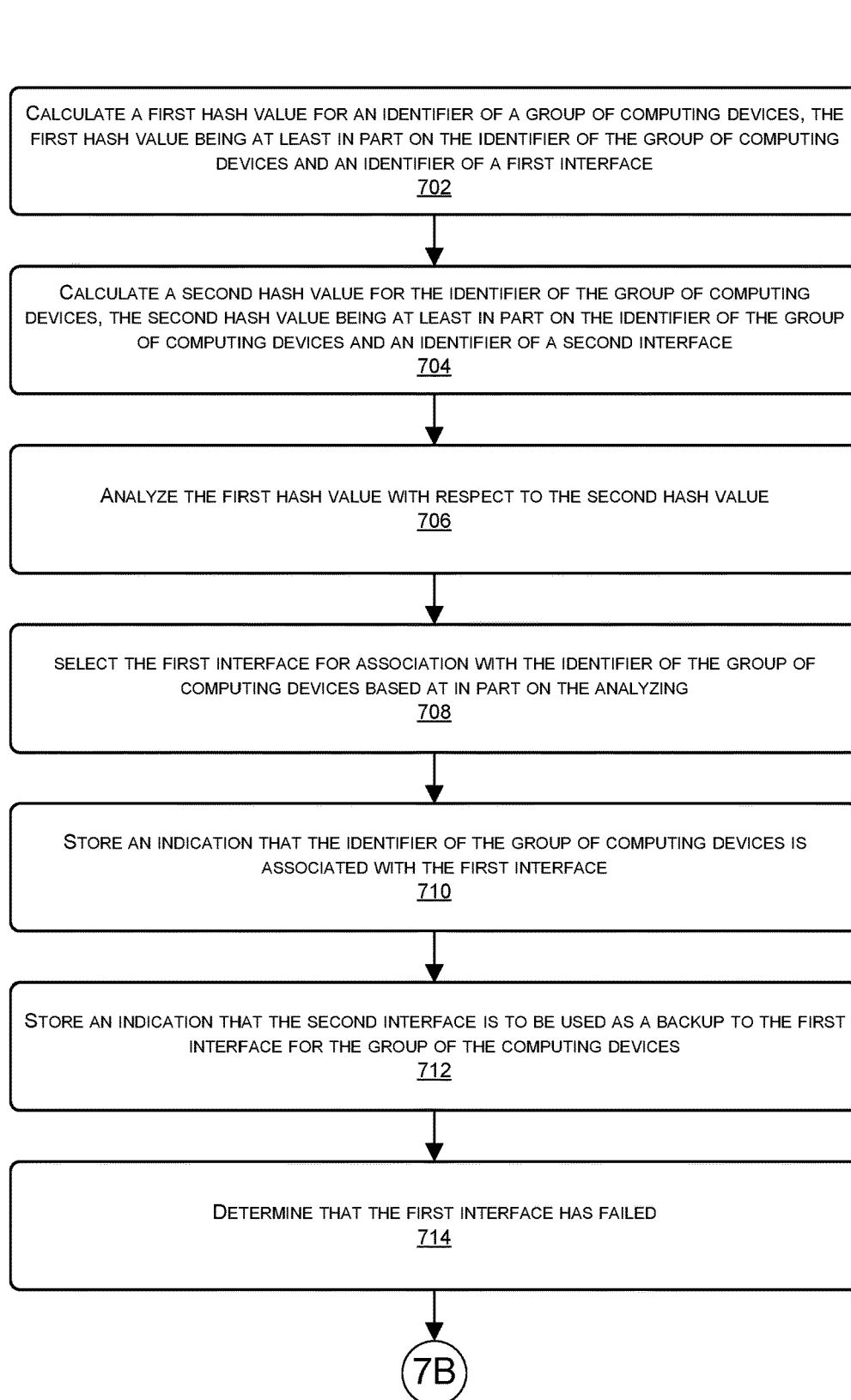
FIGS. 7A-C collectively illustrate a flow diagram of an example method for assigning and, potentially, reassigning interfaces to device-group identifiers (e.g., multicast addresses) using the techniques described herein.
Figure 7B:
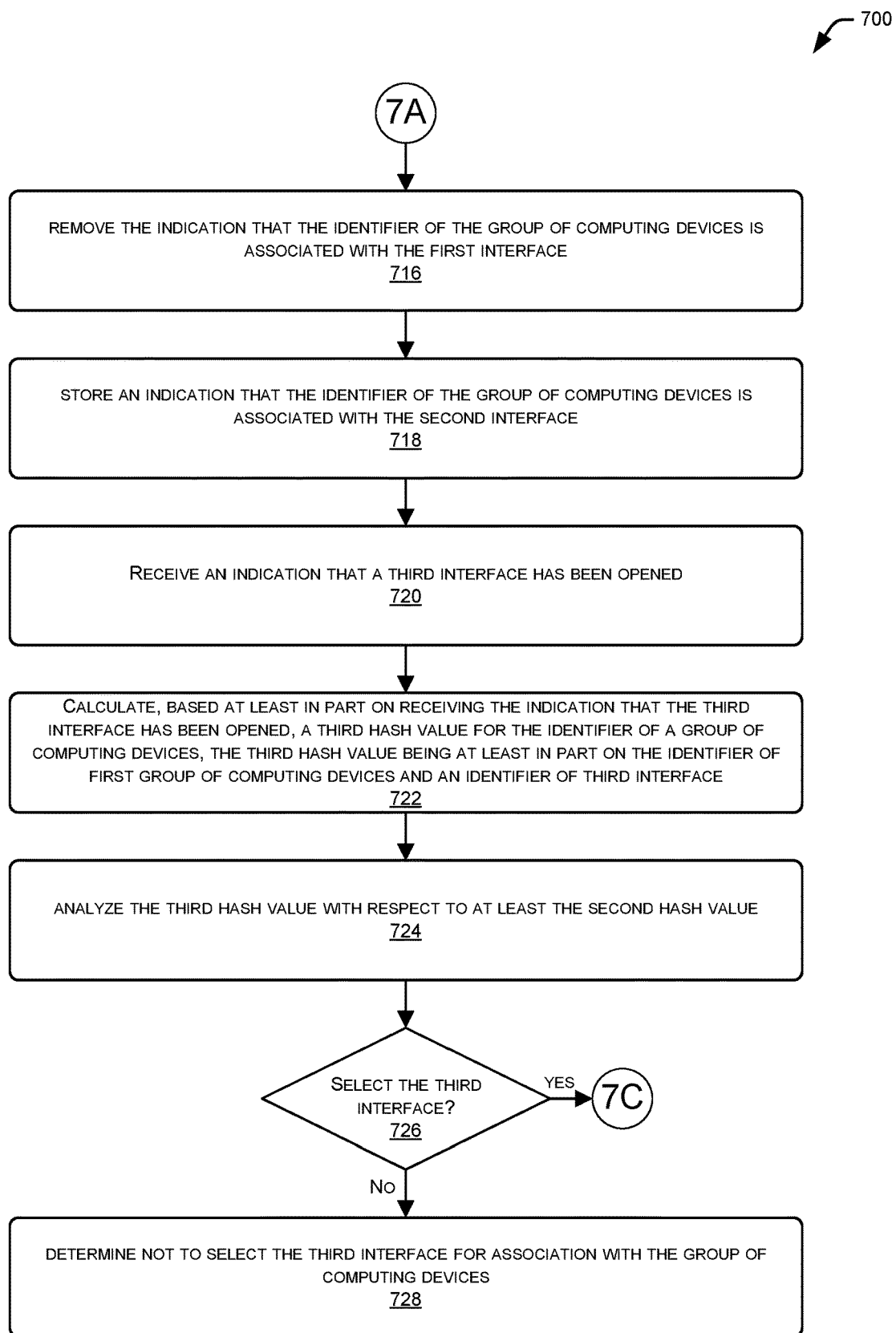
Figure 7C:
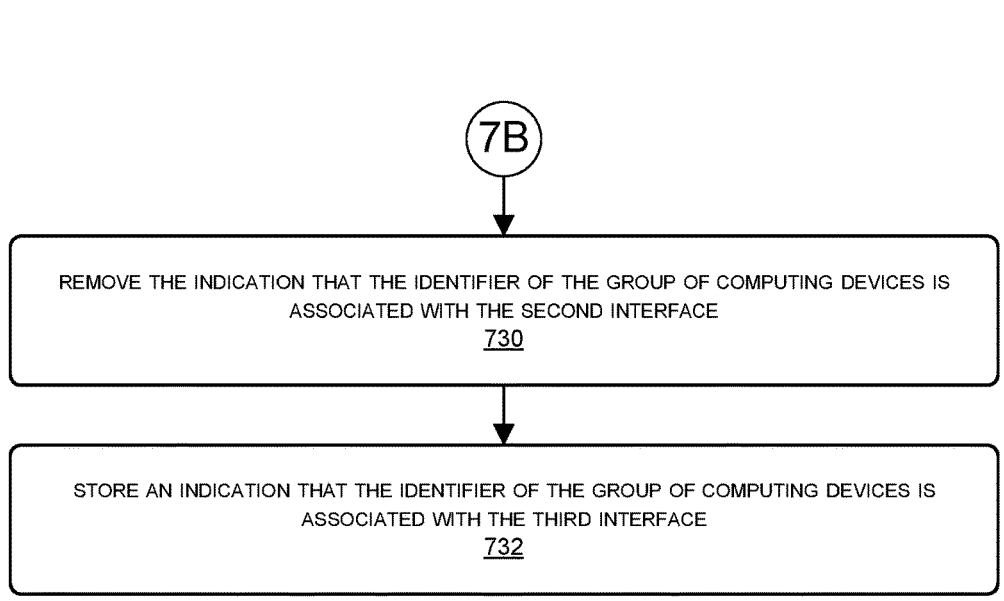

FIGS. 7A-C collectively illustrate a flow diagram of an example method 700 for assigning and, potentially, reassigning interfaces to device-group identifiers (e.g., multicast addresses) using the techniques described herein.

An operation 702 represents calculating a first hash value for an identifier of a group of computing devices, the first hash value being at least in part on the identifier of the group of computing devices and an identifier of a first interface. An operation 704, meanwhile, represents calculating a second hash value for the identifier of the group of computing devices, the second hash value being at least in part on the identifier of the group of computing devices and an identifier of a second interface. In some instances, both the first and second hash values are also based at least in part on an identifier of a computer networking device that is associated with the respective interface.

An operation 706 represents analyzing the first hash value with respect to the second hash value, while an operation 708 represents selecting the first interface for association with the identifier of the group of computing devices based at in part on the analyzing. In some instances, the analyzing comprises comparing the first hash value to the second hash value to identify a highest hash value. It is to be appreciated, however, that in other instances, any agreed-upon function may be used for selecting the interface, such as selecting an interface having a lowest hash value, or the like.

An operation 710, meanwhile, represents storing an indication that the identifier of the group of computing devices is associated with the first interface, while an operation 712 represents storing an indication that the second interface is to be used as a backup to the first interface for the group of the computing devices. At an operation 714, the method 700 determines that the first interface has failed.

FIG. 7B continues the illustration of the method 700 and includes, at an operation 716, removing the indication that the identifier of the group of computing devices is associated with the first interface and storing, at an operation 718, an indication that the identifier of the group of computing devices is associated with the second interface. That is, given that the primary interface has failed, communications to and from the identifier of the group of computing devices may now be routed through the second interface, which comprised the back interface.

An operation 720 represents receiving an indication that a third interface has been opened. At an operation 722, the method 700 calculates, based at least in part on receiving the indication that the third interface has been opened, a third hash value for the identifier of a group of computing devices, the third hash value being at least in part on the identifier of first group of computing devices and an identifier of third interface. An operation 724 represents analyzing the third hash value with respect to at least the second hash value (corresponding to the interface that is now the primary interface). An operation 726 represents determining whether to select the third interface as the primary interface (e.g., based on the third hash value being larger than the second hash value). If not, then an operation 728 represents determining not to select the third interface for association with the group of computing devices based at least in part on the analyzing of the third hash value with respect to at least the first hash value If the third interface is selected, then the method 700 proceeds to FIG. 7C. An operation 730 represents removing the indication that the identifier of the group of computing devices is associated with the second interface and, at an operation 732, storing an indication that the identifier of the group of computing devices is associated with the third interface. Therefore, communications sent to and/or from the identifier of the group of computing devices will be routed via the third interface.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 5, 6, and 7A-C, and as described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 8:
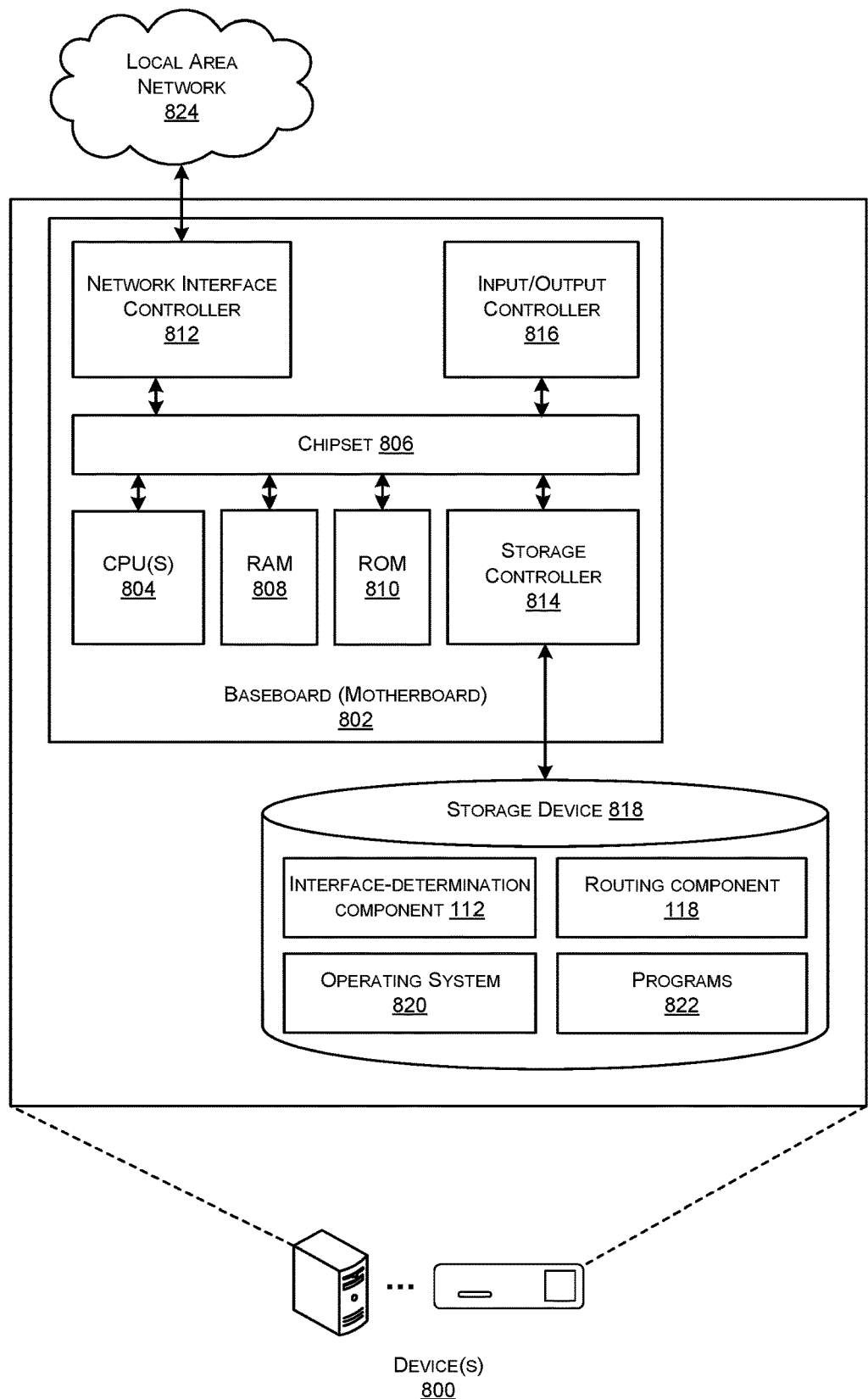
FIG. 8 is a computer architecture diagram showing an illustrative computer hardware architecture for implementing devices, such as computer networking devices, configured to implement the techniques described herein.

FIG. 8 is a computer architecture diagram showing an illustrative computer hardware architecture for implementing a device 800 that can be utilized to implement aspects of the various technologies presented herein. The computer networking devices 106 and/or the servers 102, discussed above, may include some or all of the components discussed below with reference to the device 800.

As mentioned above, the computing resources provided by a cloud computing network, data center, or the like can be data processing resources such as VM instances or hardware computing systems, database clusters, computing clusters, storage clusters, data storage resources, database resources, networking resources, and others. Some of the devices 800 can also be configured to execute a resource manager capable of instantiating and/or managing the computing resources. In the case of VM instances, for example, the resource manager can be a hypervisor or another type of program configured to enable the execution of multiple VM instances on a single server device 800. Devices 800 in a data center can also be configured to provide network services and other types of services.

The device 800 includes a baseboard 802, or "motherboard," which is a printed circuit board to which a multitude of components or devices can be connected by way of a system bus or other electrical communication paths. In one illustrative configuration, one or more central processing units (CPUs) 804 operate in conjunction with a chipset 806. The CPUs 804 can be standard programmable processors that perform arithmetic and logical operations necessary for the operation of the device 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the device 800. The chipset 806 can further provide an interface to a computer-readable storage medium such as a read-only memory (ROM) 810 or non-volatile RAM (NVRAM) for storing basic routines that help to startup the device 800 and to transfer information between the various components and devices. The ROM 810 or NVRAM can also store other software components necessary for the operation of the device 800 in accordance with the configurations described herein.

The device 800 can operate in a networked environment using logical connections to remote computing devices and computer systems through a network, such as a local area network 824. The chipset 806 can include functionality for providing network connectivity through a Network Interface Card (NIC) 812, such as a gigabit Ethernet adapter. The NIC 812 is capable of connecting the device 800 to other computing devices over the network. It should be appreciated that multiple NICs 812 can be present in the device 800, connecting the computer to other types of networks and remote computer systems.

The device 800 can be connected to a storage device 818 that provides non-volatile storage for the computer. The storage device 818 can store an operating system 820, programs 822, and data, which have been described in greater detail herein. The storage device 818 can be connected to the device 800 through a storage controller 814 connected to the chipset 806. The storage device 818 can consist of one or more physical storage units. The storage controller 814 can interface with the physical storage units through a serial attached SCSI (SAS) interface, a serial advanced technology attachment (SATA) interface, an FC interface, or other type of interface for physically connecting and transferring data between computers and physical storage units.

The device 800 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the device 800 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The device 800 can further read information from the storage device 818 by detecting the physical states or characteristics of one or more particular locations within the physical storage units.

In addition to the mass storage device 818 described above, the device 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 800.

By way of example, and not limitation, computer-readable storage media can include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 720 utilized to control the operation of the device 800. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 818 can store other system or application programs and data utilized by the device 800.

In one embodiment, the storage device 818 or other computer-readable storage media is encoded with computer-executable instructions which, when loaded into the device 800, transform the computer from a general-purpose computing system into a special-purpose computer capable of implementing the embodiments described herein. These computer-executable instructions transform the device 800 by specifying how the CPUs 804 transition between states, as described above. According to one embodiment, the device 800 has access to computer-readable storage media storing computer-executable instructions which, when executed by the device 800, perform the various processes described above with regard to FIGS. 4-7C. The device 800 can also include computer-readable storage media having instructions stored thereupon for performing any of the other computer-implemented operations described herein.

The device 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the device 800 might not include all of the components shown in FIG. 8, can include other components that are not explicitly shown in FIG. 8, or might utilize an architecture completely different than that shown in FIG. 8.

The server device 800 may also store, in the storage device 818, the interface-determination component 112 and the routing component 118 for performing some or all of the techniques described above with reference to FIGS. 1-7C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method comprising:
   determining a first hash value associated with an identifier of a group of computing devices based at least in part on an identifier of a first interface of a first switch device that is capable of sending traffic to the group of computing devices;
   determining a second hash value associated with the identifier of the group of computing devices based at least in part on an identifier of a second interface of a second switch device that is capable of sending the traffic to the group of computing devices; and
   causing the traffic to be sent to the group of computing devices via the first interface of the first switch device based at least in part on a determination that the first hash value is larger than the second hash value.

2. The method of claim 1, further comprising:
   determining that the first hash value is larger than the second hash value; and
   determining that the first interface of the first switch device is a greater interface for sending the traffic to the group of computing devices than the second interface of the second switch device based at least in part on the first hash value being larger than the second hash value,
   wherein causing the traffic to be sent to the group of computing devices via the first interface of the first switch device is based at least in part on determining that the first interface of the first switch device is the greater interface for sending the traffic to the group of computing devices than the second interface of the second switch device.

3. The method of claim 2, further comprising:
   determining that the second hash value is a second-largest value out of a group of multiple hash values that includes the first hash value and the second hash value;
   determining that the second interface of the second switch device is a greater interface for sending the traffic to the group of computing devices than a third interface of a third switch device based at least in part on the second hash value being the second-largest value; and
   storing an indication that the second interface of the second switch device is to be used as a backup to the first interface of the first switch device for sending the traffic to the group of computing devices.

4. The method of claim 1, wherein the first hash value and the second hash value are calculated by at least one of the first switch device, the second switch device, or a centralized controller.

5. The method of claim 1, wherein the first switch device is a first spine switch and the second switch device is a second spine switch.

6. The method of claim 1, wherein:
determining the first hash value is further based at least in part on an identifier of the first switch device, and
determining the second hash value is further based at least in part on an identifier of the second switch device.

7. The method of claim 1, wherein the first hash value is determined by both of the first switch device and the second switch device, and wherein the first hash value as determined by the first switch device is of a same value as the first hash value as determined by the second switch device.

8. A system comprising:
one or more processors; and
one or more non-transitory computer-readable media storing instruction that, when executed, cause the one or more processors to perform operations comprising:
determining a first hash value associated with an identifier of a group of computing devices based at least in part on an identifier of a first interface of a first switch device that is capable of sending traffic to the group of computing devices;
determining a second hash value associated with the identifier of the group of computing devices based at least in part on an identifier of a second interface of a second switch device that is capable of sending the traffic to the group of computing devices; and
causing the traffic to be sent to the group of computing devices via the first interface of the first switch device based at least in part on a determination that the first hash value is larger than the second hash value.

9. The system of claim 8, the operations further comprising:
determining that the first hash value is larger than the second hash value; and
determining that the first interface of the first switch device is a greater interface for sending the traffic to the group of computing devices than the second interface of the second switch device based at least in part on the first hash value being larger than the second hash value,
wherein causing the traffic to be sent to the group of computing devices via the first interface of the first switch device is based at least in part on determining that the first interface of the first switch device is the greater interface for sending the traffic to the group of computing devices than the second interface of the second switch device.

10. The system of claim 9, the operations further comprising:
determining that the second hash value is a second-largest value out of a group of multiple hash values that includes the first hash value and the second hash value;
determining that the second interface of the second switch device is a greater interface for sending the traffic to the group of computing devices than a third interface of a third switch device based at least in part on the second hash value being the second-largest value; and
storing an indication that the second interface of the second switch device is to be used as a backup to the first interface of the first switch device for sending the traffic to the group of computing devices.

11. The system of claim 8, wherein the first hash value and the second hash value are calculated by at least one of the first switch device, the second switch device, or a centralized controller.

12. The system of claim 8, wherein the first switch device is a first spine switch and the second switch device is a second spine switch.

13. The system of claim 8, wherein:
determining the first hash value is further based at least in part on an identifier of the first switch device, and
determining the second hash value is further based at least in part on an identifier of the second switch device.

14. The system of claim 8, wherein the first hash value is determined by both of the first switch device and the second switch device, and wherein the first hash value as determined by the first switch device is of a same value as the first hash value as determined by the second switch device.

15. One or more non-transitory computer-readable media storing instruction that, when executed, cause one or more processors to perform operations comprising:
determining a first hash value associated with an identifier of a group of computing devices based at least in part on an identifier of a first interface of a first switch device that is capable of sending traffic to the group of computing devices;
determining a second hash value associated with the identifier of the group of computing devices based at least in part on an identifier of a second interface of a second switch device that is capable of sending the traffic to the group of computing devices; and
causing the traffic to be sent to the group of computing devices via the first interface of the first switch device based at least in part on a determination that the first hash value is larger than the second hash value.

16. The one or more non-transitory computer-readable media of claim 15, the operations further comprising:
determining that the first hash value is larger than the second hash value; and
determining that the first interface of the first switch device is a greater interface for sending the traffic to the group of computing devices than the second interface of the second switch device based at least in part on the first hash value being larger than the second hash value,
wherein causing the traffic to be sent to the group of computing devices via the first interface of the first switch device is based at least in part on determining that the first interface of the first switch device is the greater interface for sending the traffic to the group of computing devices than the second interface of the second switch device.

17. The one or more non-transitory computer-readable media of claim 16, the operations further comprising:
determining that the second hash value is a second-largest value out of a group of multiple hash values that includes the first hash value and the second hash value;
determining that the second interface of the second switch device is a greater interface for sending the traffic to the group of computing devices than a third interface of a third switch device based at least in part on the second hash value being the second-largest value; and
storing an indication that the second interface of the second switch device is to be used as a backup to the first interface of the first switch device for sending the traffic to the group of computing devices.

18. The one or more non-transitory computer-readable media of claim 15, wherein the first hash value and the second hash value are calculated by at least one of the first switch device, the second switch device, or a centralized controller.

19. The one or more non-transitory computer-readable media of claim 15, wherein:
   determining the first hash value is further based at least in part on an identifier of the first switch device,
   determining the second hash value is further based at least in part on an identifier of the second switch device, and
   wherein the first hash value is determined by both of the first switch device and the second switch device, the first hash value as determined by the first switch device is of a same value as the first hash value as determined by the second switch device.

20. The one or more non-transitory computer-readable media of claim 15, wherein the first switch device is a first spine switch and the second switch device is a second spine switch.

* * * * *